United States Patent
Williams, Jr. et al.

(10) Patent No.: US 10,715,455 B2
(45) Date of Patent: Jul. 14, 2020

(54) PACKET SWITCHING DEVICE MODIFYING PATHS OF FLOWS OF PACKETS TAKEN WITHIN WHILE OUTPUTTING PACKETS IN RECEIVED INTRA-FLOW ORDER BUT NOT NECESSARILY INTER-FLOW ORDER

(71) Applicant: Cisco Technology, Inc., San Jose, CA (US)

(72) Inventors: John J. Williams, Jr., Pleasanton, CA (US); Naader Hasani, San Jose, CA (US); Mohammed Ismael Tatar, Kanata (CA); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 15/663,084

(22) Filed: Jul. 28, 2017

(65) Prior Publication Data
US 2019/0036832 A1 Jan. 31, 2019

(51) Int. Cl.
*H04L 12/801* (2013.01)
*H04L 12/947* (2013.01)
*H04L 12/861* (2013.01)
*H04L 12/875* (2013.01)

(52) U.S. Cl.
CPC ............ *H04L 47/34* (2013.01); *H04L 49/25* (2013.01); *H04L 47/56* (2013.01); *H04L 49/9057* (2013.01)

(58) Field of Classification Search
CPC ......... H04L 47/34; H04L 49/25; H04L 47/56; H04L 49/9057
See application file for complete search history.

(56) References Cited

U.S. PATENT DOCUMENTS

| | | |
|---|---|---|
| 6,747,972 B1 | 6/2004 | Lenoski et al. |
| 6,816,492 B1 | 11/2004 | Turner et al. |
| 6,826,186 B1 | 11/2004 | Dittia et al. |
| 6,832,261 B1 | 12/2004 | Westbrook et al. |
| 6,907,041 B1 | 6/2005 | Turner et al. |
| 6,934,760 B1 | 8/2005 | Westbrook et al. |

(Continued)

OTHER PUBLICATIONS

Kandula et al., "Dynamic Load Balancing Without Packet Reordering," ACM SIGCOMM Computer Communication Review, Apr. 2007, pp. 53-62, vol. 37, No. 2, ACM Press New York, NY.

*Primary Examiner* — Alpus Hsu
*Assistant Examiner* — Camquyen Thai
(74) *Attorney, Agent, or Firm* — The Law Office of Kirk D. Williams

(57) ABSTRACT

In one embodiment, for each distribution period of time, each packet flow is assigned to a path through a packet switching device (e.g., switch fabric) with all packets of the packet flow being sent in order over the assigned path. For a next distribution period, different paths are assigned for these packet flows, with all packets being sent in order over the new corresponding selected path. In one embodiment, these paths are switched often enough to prevent congestion, yet infrequent enough so as to minimize resources for reordering. In one embodiment, the reordering is done at the egress and only for predefined high bandwidth flows (e.g., elephant flows). A distribution period indication is typically associated with each packet to identify its corresponding distribution period. In one embodiment, each routing and egress switching stage in a switching fabric performs reordering.

13 Claims, 10 Drawing Sheets

(56) References Cited

U.S. PATENT DOCUMENTS

| | | |
|---|---|---|
| 6,967,926 B1 | 11/2005 | Williams, Jr. et al. |
| 7,009,976 B1 | 3/2006 | Michelson et al. |
| 7,480,308 B1 | 1/2009 | Cohen et al. |
| 10,218,629 B1* | 2/2019 | An .................. H04L 47/283 |
| 2013/0182716 A1* | 7/2013 | Gemelli ............ H04L 49/1523 370/419 |
| 2014/0369351 A1* | 12/2014 | Singh ............... H04L 49/9057 370/390 |
| 2016/0226797 A1* | 8/2016 | Aravinthan ....... H04L 49/3027 |

* cited by examiner

PACKET SWITCHING DEVICE MODIFYING PATHS OF FLOWS OF PACKETS TAKEN WITHIN WHILE OUTPUTTING PACKETS IN RECEIVED INTRA-FLOW ORDER BUT NOT NECESSARILY INTER-FLOW ORDER

TECHNICAL FIELD

The present disclosure relates a packet switching device and communicating packets within, including, but not limited to distributing flows of packets across multiple paths between distribution and egress switch elements (e.g., of a packet switching fabric and/or line cards).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. In order to communicate information at a rate higher than that of a single link, packets can be sent over multiple links.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
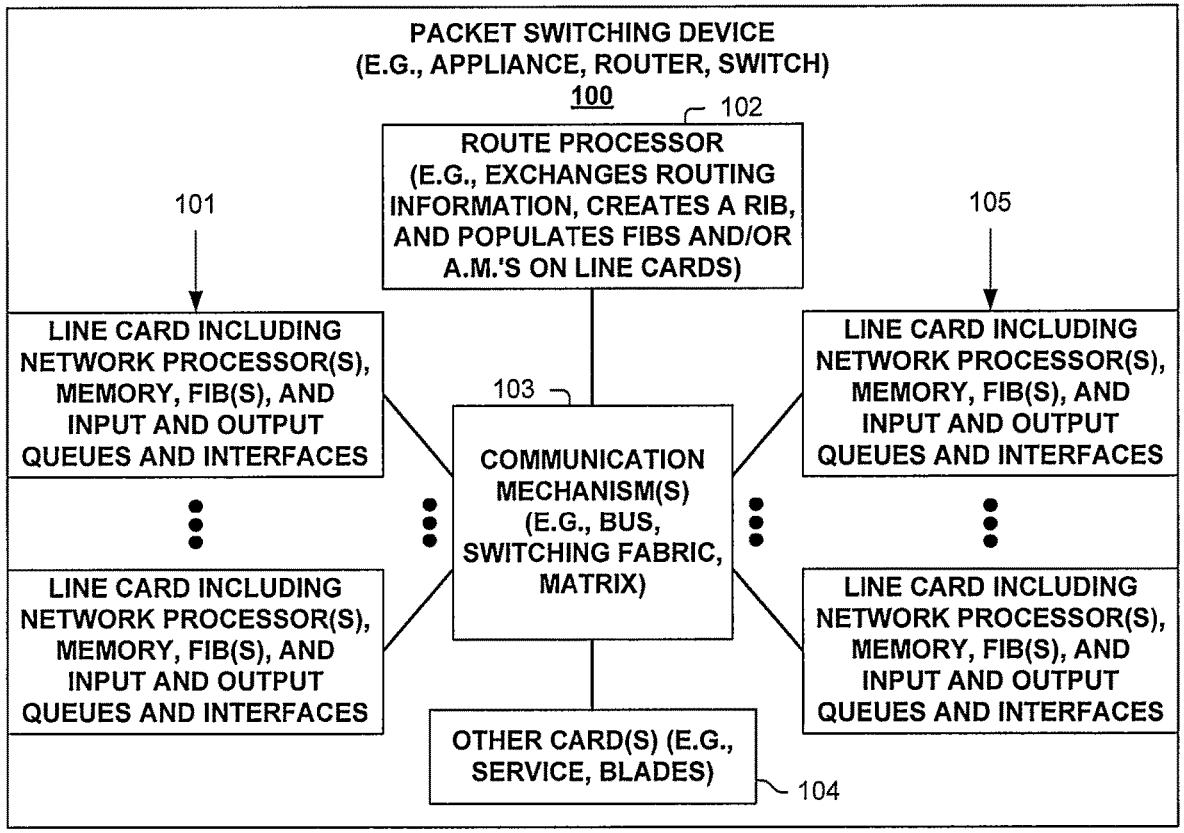
FIG. 1A illustrates a packet switching device according to one embodiment.

Disclosed are, inter alia, methods, apparatus, computer-storage media, mechanisms, and means associated with a packet switching device modifying paths of flows of packets taken within, while outputting packets in received intra-flow order but not necessarily inter-flow order.

In one embodiment, a packet switching device includes (possibly within a packet switching fabric): distribution stage switch elements, routing stage switch elements, and egress stage switch elements, with each of the routing stage switch elements providing a portion of multiple paths between each of the distribution stage switch elements and each of the egress stage switch elements.

In one embodiment, for each current distribution period of multiple ordered distribution periods, each particular distribution stage switch element sends packets of multiple packet flows to a corresponding routing stage switch element, with packets of a same packet flow sent in received order, and with the corresponding routing stage switch element determined based on the current distribution period and the same packet flow such that the corresponding routing stage switch element varies for different distribution periods for the same packet flow. In one embodiment, each of the egress switch elements forwards outbound packets received from the routing stage switch elements in the order of the ordered distribution periods and there within, in the order of receipt of said outbound packets.

One embodiment includes a method, comprising repeatedly performing operations to communicate packets of a packet flow during multiple ordered distribution periods over multiple paths between a distributor switch element and an egress switch element within a packet switching device, with said operations including: identifying for the packet flow a particular path based on the packet flow and a current distribution period, sending in sequence a next particular plurality of packets of the packet flow over said identified particular path, and advancing the current distribution period to a next distribution period. The egress switch element receives and enqueues distributed packets of the packet flow in output queues for corresponding distribution periods for an output of the egress switch element, and dequeues and sends from the output packets from said output queues according to the order defined by the plurality of ordered distribution periods. In one embodiment, wherein the packet switching device includes a plurality of routing switch elements, with each of the plurality of routing switch elements corresponding to a different one of the plurality of paths; and wherein each of said distributed packets is marked by the distributor switch element with a current distribution period indication that identifies the current distribution period, with said marking used by the egress switch element in identifying which of said output queues to enqueue each of said received distributed packets.

2. Description

Disclosed are, inter alia, methods, apparatus, computer-storage media, mechanisms, and means associated with a packet switching device modifying paths of flows of packets taken within while outputting packets in received intra-flow order but not necessarily inter-flow order.

As used herein, a flow of packets (also referred to as a packet flow) refers to a sequence of related packets received on a same input interface of a packet switching device and to be sent in received order from a same output interface of the packet switching device. In one embodiment, a packet flow includes, inter alia, a communication session, connection, tunnel, stream, label-switched path, etc. A particular packet flow is typically identified by one or more values (e.g., a 5-tuple, a 2-tuple) from each packet that can be used to identify (e.g., maps) to an identifiable packet flow. Further, as used herein, a "queue" refers to a first-in first-out (FIFO) queue.

In one embodiment, for each distribution period of time, each packet flow is assigned to a path through a packet switching device (e.g., a path within a switch fabric) with all packets being sent in order over the corresponding selected path. For a next distribution period, different paths are selected for these packet flows, with all packets being sent in order over the new corresponding selected path. In one embodiment, these paths are switched often enough to prevent congestion, yet infrequent enough so as to minimize resources for reordering in routing stage or egress stage switch elements.

In one embodiment, the reordering is done at the egress and only for predefined high bandwidth flows (e.g., elephant flows). The egress keeps enough reordering buffer to store packets in order arriving from each path. A distribution period indication identifies the distribution period of multiple ordered distribution periods (e.g., identifies a set of sequential packets sent over a same path). In one embodiment, reordering is done at one or more, possibly each routing and egress stage in the fabric.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1B:
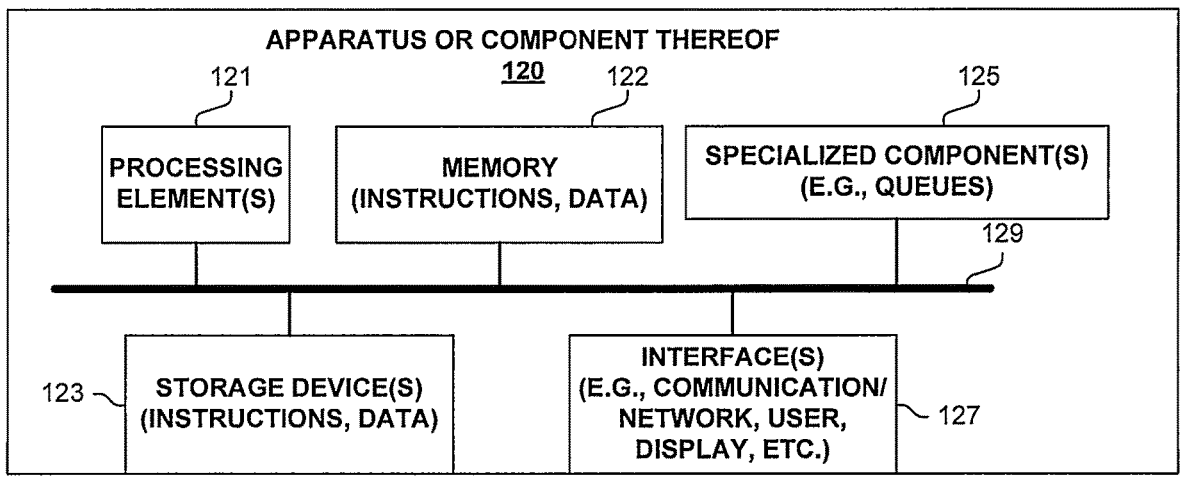
FIG. 1B illustrates an apparatus according to one embodiment.

FIGS. 1A-B and their discussion herein are intended to provide a description of various exemplary packet switching systems used in forwarding packets according to one embodiment.

One embodiment of a packet switching device 100 is illustrated in FIG. 1A. As shown, packet switching device 100 includes multiple line cards 101 and 105, each with one or more network interfaces for sending and receiving packets over communications links (e.g., possibly part of a link aggregation group), and with one or more processing elements that are used in one embodiment associated with a packet switching device modifying paths of flows of packets taken within, while outputting packets in received intra-flow order but not necessarily inter-flow order. Packet switching device 100 also has a control plane with one or more processing elements 102 for managing the control plane and/or control plane processing of packets associated with a packet switching device modifying paths of flows of packets taken within, while outputting packets in received intra-flow order but not necessarily inter-flow order. Packet switching device 100 also includes other cards 104 (e.g., service cards, blades) which include processing elements that are used in one embodiment to process (e.g., forward, drop, manipulate) packets associated with a packet switching device modifying paths of flows of packets taken within, while outputting packets in received intra-flow order but not necessarily inter-flow order, and some communication mechanism 103 (e.g., bus, switching fabric, and/or matrix, etc.) for allowing its different entities 101, 102, 104 and 105 to communicate.

Line cards 101 and 105 typically perform the actions of being both an ingress and egress line card, in regards to multiple other particular packets and/or packet streams being received by, or sent from, packet switching device 100. In one embodiment, line cards 101 and 105 include (or perform the distribution and reorder functionality of) a distribution switch element and/or egress switch element, in which case and in one embodiment, they are at least part or a complete a distribution switch element and/or egress switch element. In one embodiment, line cards 101 and 105 include queues for multiple distribution periods for each output interface for sending packets in intra-flow order but not necessarily inter-flow order.

FIG. 1B is a block diagram of an apparatus 120 used in one embodiment associated with a packet switching device modifying paths of flows of packets taken within, while outputting packets in received intra-flow order but not necessarily inter-flow order. In one embodiment, apparatus 120 performs one or more processes, or portions thereof, corresponding to one of the flow diagrams illustrated or otherwise described herein, and/or illustrated in another diagram or otherwise described herein.

In one embodiment, apparatus 120 includes one or more processor(s) 121 (typically with on-chip memory), memory 122, storage device(s) 123, specialized component(s) 125 (e.g. optimized hardware such as for performing lookup and/or packet processing operations, queues for multiple distribution periods for each output interface for sending packets in intra-flow order but not necessarily inter-flow order, etc.), and interface(s) 127 for communicating information (e.g., sending and receiving packets, user-interfaces, displaying information, etc.), which are typically communicatively coupled via one or more communications mechanisms 129 (e.g., bus, links, switching fabric, matrix), with the communications paths typically tailored to meet the needs of a particular application.

Various embodiments of apparatus 120 may include more or fewer elements. The operation of apparatus 120 is typically controlled by processor(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processor(s) 121 and/or data which is manipulated by processor(s) 121 for implementing functionality in accordance with an embodiment. Storage device(s) 123 are another type of computer-readable medium, and typically comprise solid state storage media, disk drives, diskettes, networked services, tape drives, and other storage devices. Storage device(s) 123 typically store computer-executable instructions to be executed by processor(s) 121 and/or data which is manipulated by processor(s) 121 for implementing functionality in accordance with an embodiment.

Figure 2A:
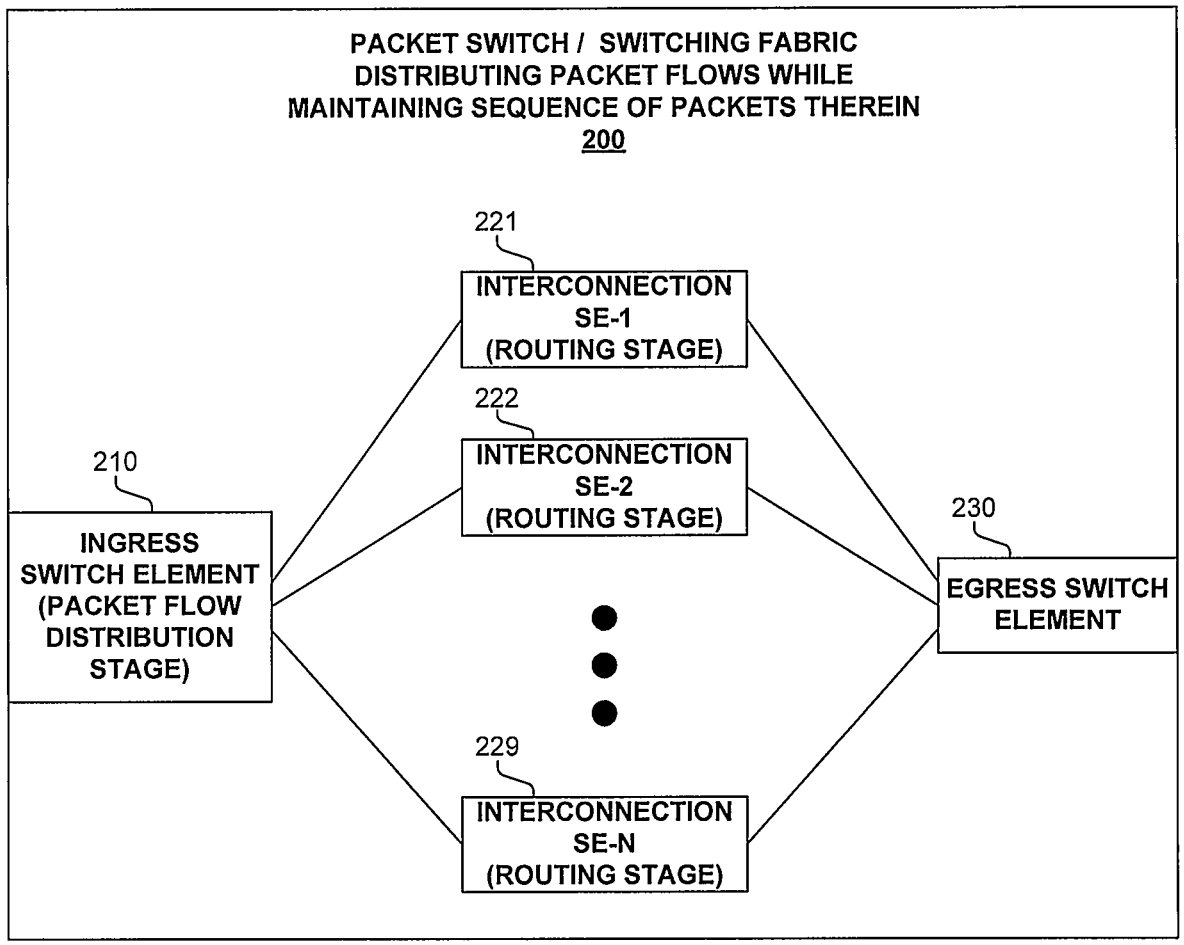
FIG. 2A illustrates a packet switching fabric according to one embodiment.

FIG. 2A illustrates a packet switch and/or packet switching fabric (also referred to as a packet switch fabric) 200 according to one embodiment that includes multiple paths defined by interconnection switch elements 221-229 which forward packet traffic in order. In one embodiment, switch elements 221-229 are routing stage switch elements of a packet switching fabric. In one embodiment, ingress switch element 210 and/or egress switch element 230 are part of one or more line cards of a packet switching device.

In one embodiment, at least a portion of packets are sent across fabric 200 in sequential distribution periods of some duration (e.g., a predetermined amount of time, an amount of bandwidth or packets, or started and/or stopped by some trigger). In one embodiment, a distribution period is used to determine corresponding paths (e.g., which interconnection switch element 221-229 to use) over which to send in-order packets of multiple packet flows (with the paths being the same and/or different for different ones of the flows of packets). During a next distribution period, the corresponding paths (221-229) for these flows of packets are typically different.

In one embodiment, egress switch element 230 includes a set of output queues for each output interface, with each set of output queues for storing packets of multiple distribution period in different queues. Egress switch element 230 receives the sent packets and enqueues them in corresponding output queues (e.g., based on output, distribution period). In one embodiment, some paths (221-229) can have different delays, and therefore the order received by egress switch element 230 of two packets of a packet flow sent by ingress switch element 210 over two different paths (221-229) may be different.

One embodiment overcomes the potential packet disorder by egress switch element 230 forwarding packets by order of distribution periods. As all packets of a packet flow during a same distribution period are sent in order (with this order maintained by paths 221-229), all packets of a packet flow will be received in order by egress switch element 230 for each distribution period. However, during that same distribution period, the order of all packets sent by ingress switch element 210 over paths 221-229 may arrive in a different order.

In other words, by selectively draining queues in order but not reordering packets within queues, the packet switching device/fabric 200 maintains intra-flow order (e.g., all packets sent over a same path 221-229 arrive in the same order and all packets of a packet flow during a distribution time are sent over a same path 221-229), but the packet switching device but does not necessarily maintain inter-flow order (e.g., there is no guaranteed received order of packets sent by ingress switch element 210 over different paths 221-229 during a distribution period).

Figure 2B:
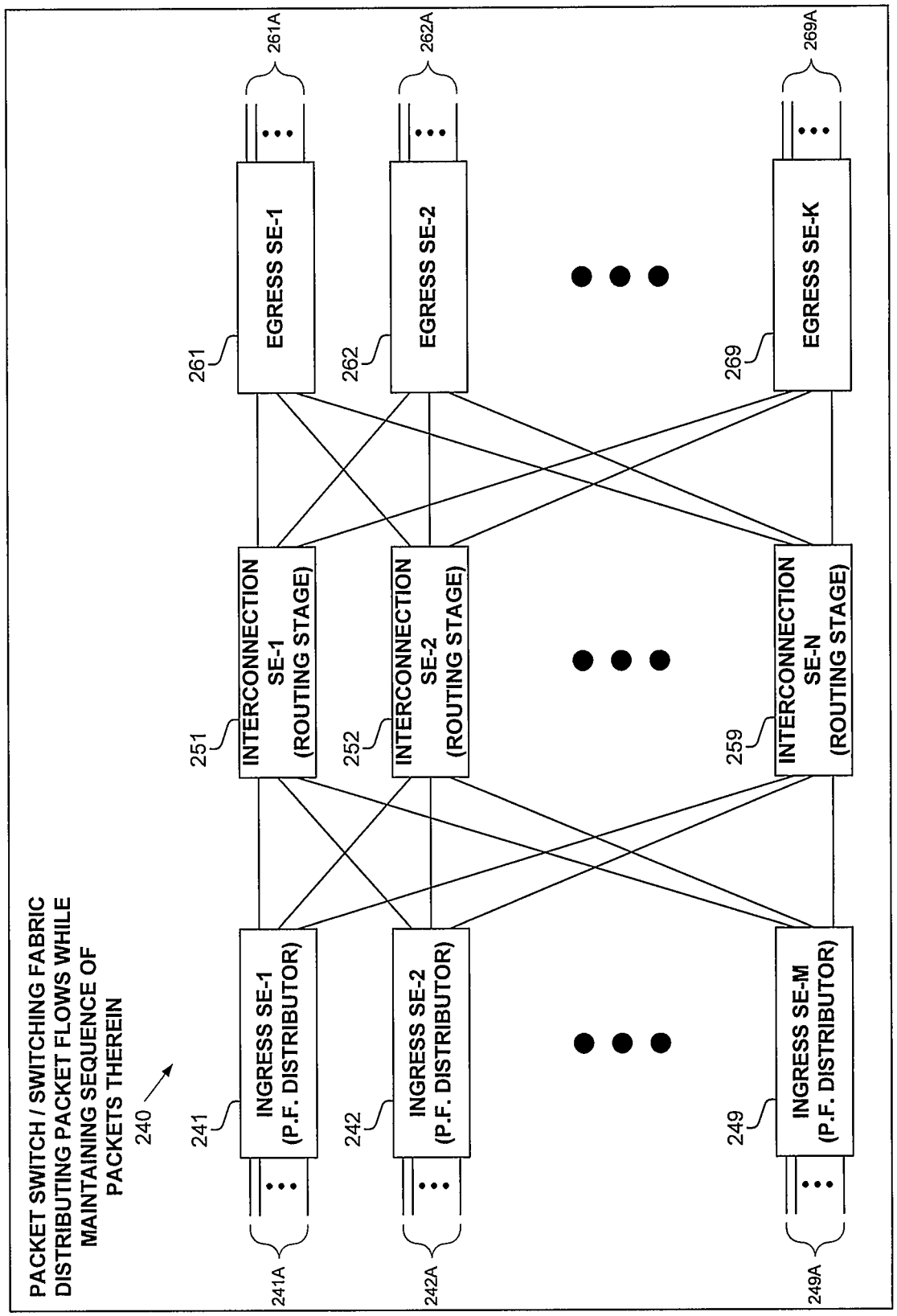
FIG. 2B illustrates a packet switching fabric according to one embodiment.

FIG. 2B illustrates a packet switch and/or packet switching fabric 240 according to one embodiment. Illustrated is a multi-stage (three stage) packet switching fabric including a distribution stage 241-249, routing stage 251-259, and egress stage 261-269. Each of distribution stage switch elements 241-249 may have one or more input interfaces 241A-249A. Each of egress stage switch elements 261-269 may have one or more output interfaces 261A-269A.

Packet switch and/or packet switching fabric 240 distributes packets of packet flows across multiple paths (251-259) therein during different distribution periods, with each of ingress switch elements 241-249 operating as discussed in relation to ingress switch element 210 (of FIG. 2A), and each of egress switch elements 261-269 operating as discussed in relation to ingress switch element 230 (of FIG. 2A).

In one embodiment, a packet switching device/fabric may have more than one distribution stage. In one embodiment, a subsequent distribution stage will use the same distribution period indication of that of the prior stage. In one embodiment, a subsequent distribution stage may use its own distribution period indication (e.g., nested or recursive distribution periods).

Figure 3A:
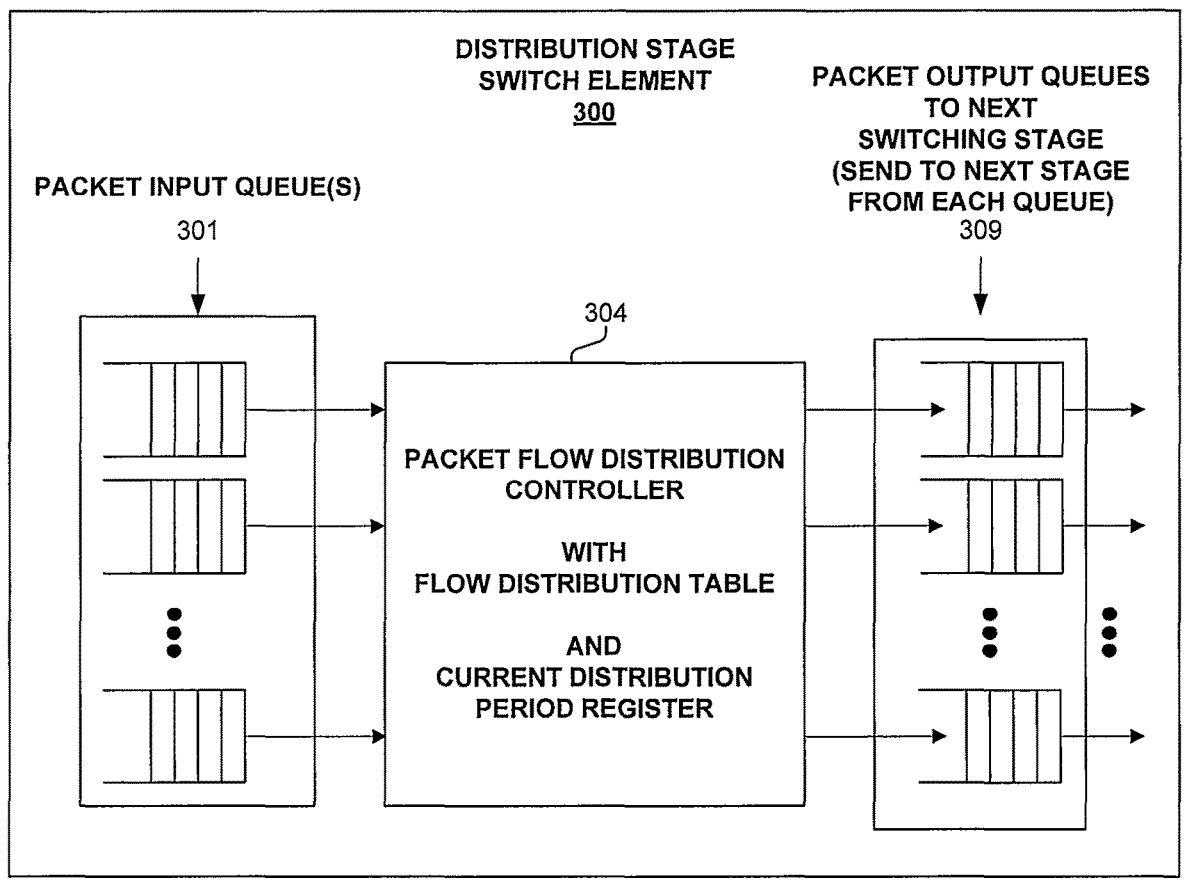
FIG. 3A illustrates a distribution stage switch element according to one embodiment.

FIG. 3A illustrates a distribution stage switch element 300 according to one embodiment. As shown, distribution stage switch element 300 includes one or more input packet queues for temporarily storing packets received, a packet flow distribution controller 304, and packet output queues 309 for communicating packets to corresponding next stage switching elements. In one embodiment, packet flow distribution controller 304 includes a current distribution period register storing an indication of the current distribution period, and a flow distribution table storing for each flow a path to take during the current distribution period. In one embodiment, values representing a packet flow are hashed into flow distribution table which identifies which path (e.g., which output queue 309) to send the particular packet. In one embodiment, an entry for each packet flow is in the flow distribution table, but typically a hash table is used as it can greatly decrease the size of flow distribution table. In response to the arrival of a next distribution period, the current distribution period register and flow distribution table are updated. In one embodiment, a different hash function is used to map packet flows into flow distribution table for one or more, or possibly each distribution period instead of, or in addition to, modifying the flow hash distribution table. In one embodiment, the number of different distribution periods is equal to, or a function of, the number of different next stage switch elements (e.g., outbound paths from the distribution stage switch element 300).

Figure 3B:
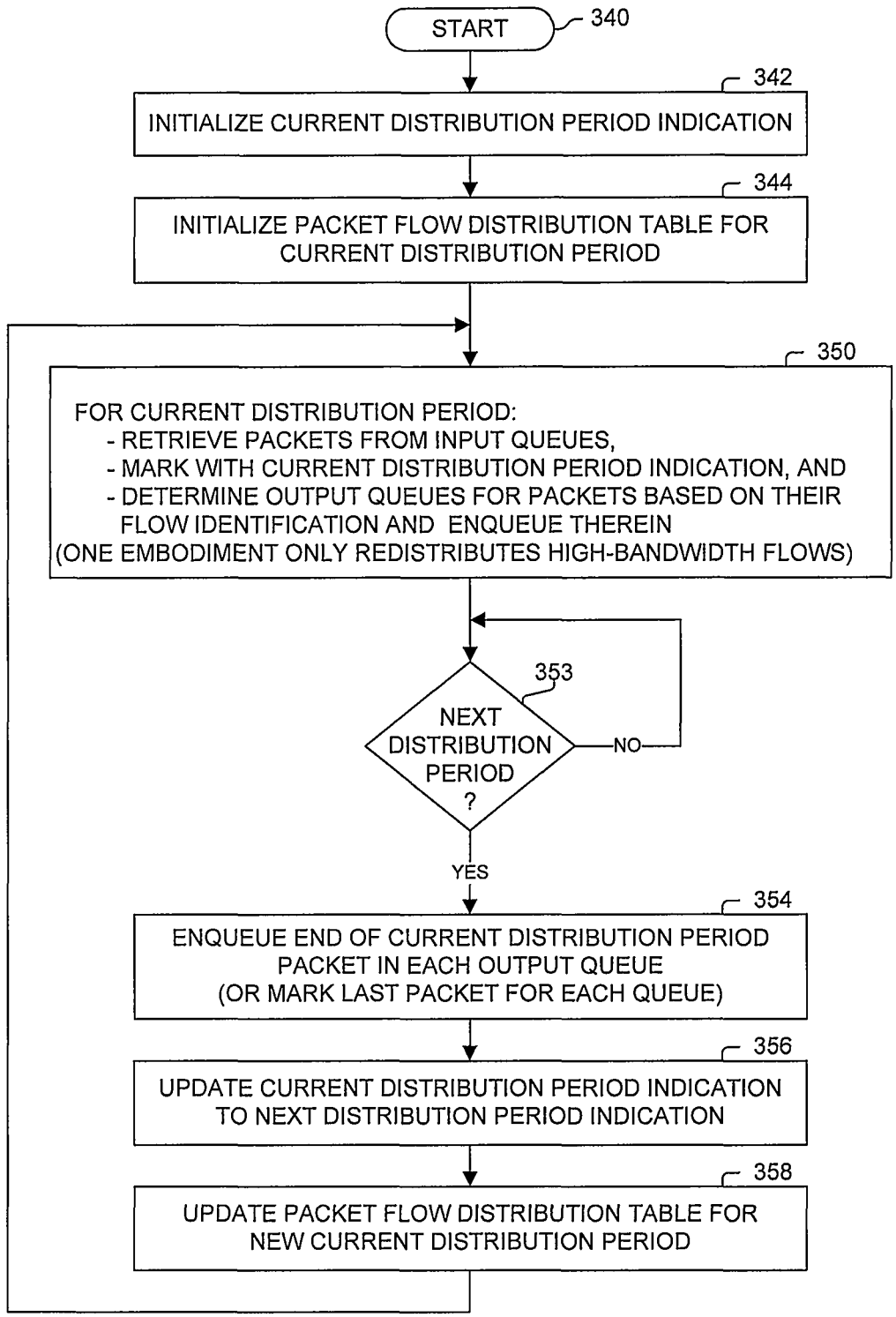
FIG. 3B illustrates a process according to one embodiment.

FIG. 3B illustrates a process performed for a distribution switching element according to one embodiment. Processing begins with process block 340. In process block 342, a current distribution period indication is initialized. In process block 344, the packet flow distribution table for the current distribution period is initialized (e.g., packet flows are mapped to paths to be used during the current distribution period).

Process block 350 is performed during the current distribution period, in which packets are retrieved from input queue(s) and marked with the current distribution period indication, and enqueued in output queues (next stage switching elements) determined for each packet typically by a lookup operation in a flow distribution table (possibly after a hashing function). In one embodiment, only high-bandwidth flows are subjected to the redistribution of paths through the packet switching device (e.g., through the switch fabric).

Process block 353 determines when the current distribution period is over (e.g., after a predetermined amount of time, an amount of bandwidth or packets, or started and/or stopped by some trigger). Processing remains at process block 353 until a next distribution period is to begin. As determined when the next distribution period is to begin, processing proceeds to process block 354, wherein typically an end of the current distribution period indication packet (including the current distribution period indication) is enqueued in each output queue. By providing such an indication, a switch element that reorders (e.g., drains one queue for a current distribution period until the end of the current distribution period) can determine immediately the end of the current distribution period rather than waiting for a timeout or other operation. In one embodiment, a last packet sent during a current distribution period may be further marked to signify that it is the last packet in the current distribution period. In process block 356, the current distribution period indication is advanced to the next distribution period in the ordered sequence of distribution periods. In process block 358, the packet flow distribution table is updated for the new current distribution period (e.g., packet flows are remapped so that some or all use a different path through the packet switching device/fabric during the new the current distribution period). Processing returns to process block 350.

Figure 3C:
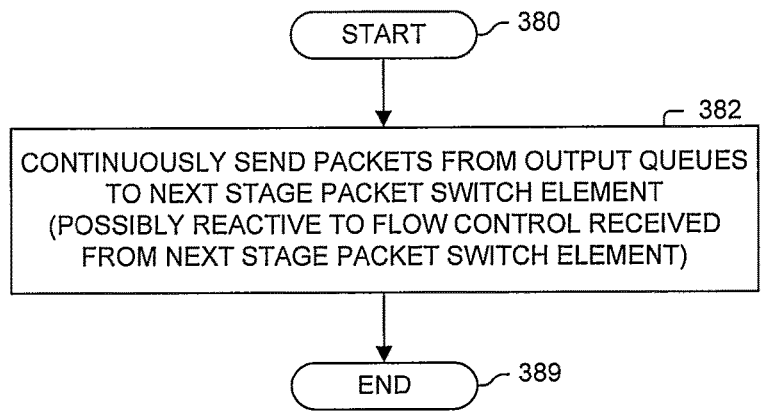
FIG. 3C illustrates a process according to one embodiment.

FIG. 3C illustrates a process performed in one embodiment by a distribution stage switch element. Processing begins with process block 380. In process block 382, packets are continuously sent from the output queues to the corresponding next stage switch element (possibly responsive to flow control information received from a next stage switch element). Processing of the flow diagram of FIG. 3C is complete as indicated by process block 389.

Figure 4A:
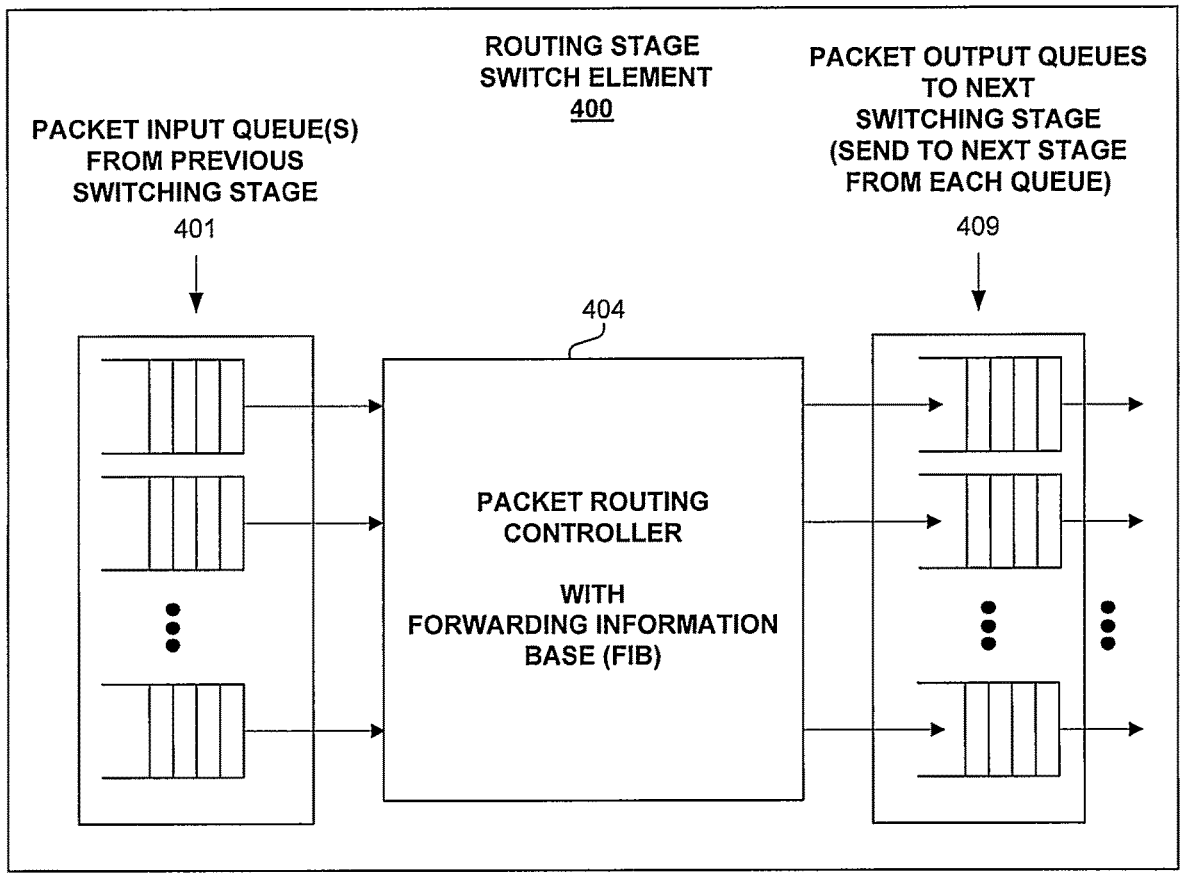
FIG. 4A illustrates a routing stage switch element according to one embodiment.

FIG. 4A illustrates a routing stage switch element 400 according to one embodiment. As shown, routing stage switch element 400 includes one or more input queues 401 for temporarily storing packets received from a previous stage switch element; a packet routing controller 404; and packet output queues 409 for sending packets to corresponding next stage switching elements. In one embodiment, packet routing controller 404 includes a forwarding information base for determining an output queue 409 for a packet. However, typically and in one embodiment, an ingress lookup operation (e.g., on a line card) already determined this information and is included in an internal header associated with the packet as it is forwarded through the packet switching device. In one embodiment, routing stage switch element 400 does not perform any packet reordering.

Figure 4B:
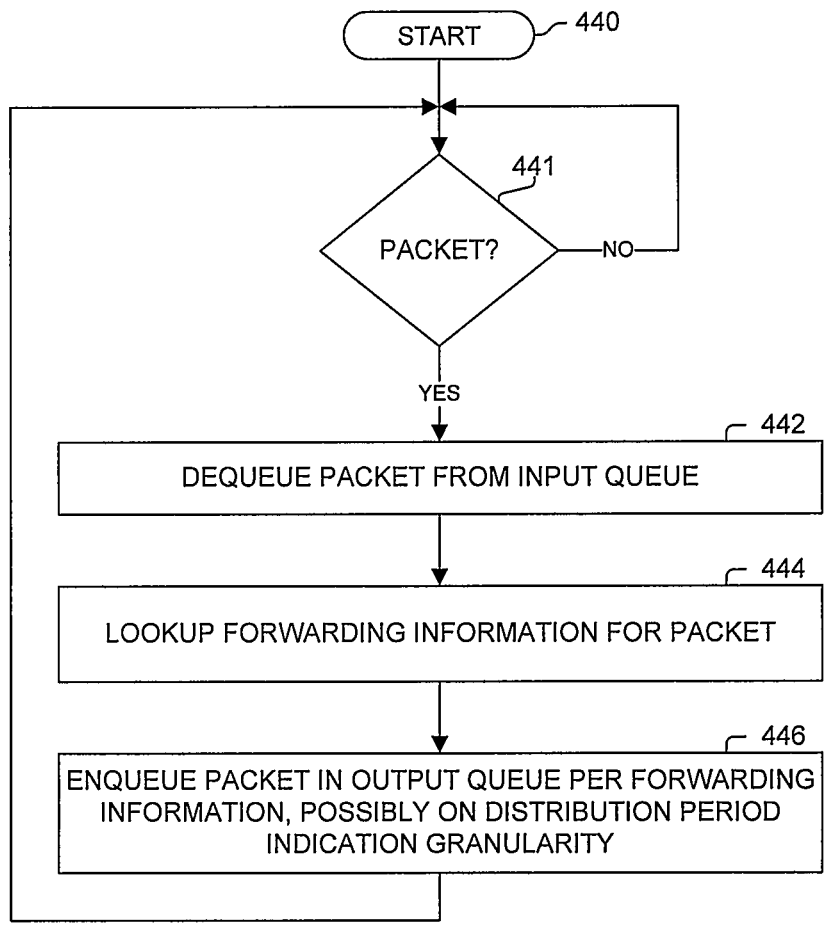
FIG. 4B illustrates a process according to one embodiment.

FIG. 4B illustrates a process performed by a routing switch element according to one embodiment. In one embodiment, multiple simultaneous processing of FIG. 4B are performed to simultaneously process multiple received packets (e.g., one process per input queue).

Processing of the flow diagram begins with process block 440, and proceeds to process block 441 where processing remains until there is a packet in an input queue to process in which case processing proceeds to process block 442. In process block 442, a packet is dequeued from an input queue. In process block 444, forwarding information is acquired (e.g., via a lookup operation or extracted from an internal header of the packet) to identify to which next switch stage switch element to send the packet. In process block 446, the packet is enqueued in the output queue corresponding to this next stage switch element and for the current distribution period associated with the packet. Processing returns to process block 441.

Figure 4C:
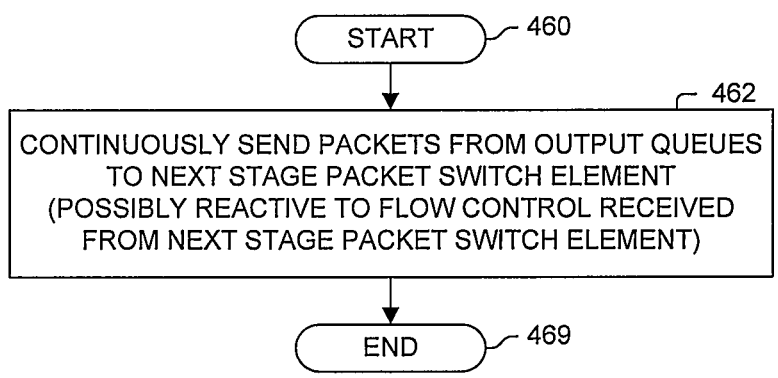
FIG. 4C illustrates a process according to one embodiment.

FIG. 4C illustrates a process performed in one embodiment by a routing stage switch element. Processing begins with process block 460. In process block 462, packets are continuously sent from the output queues to the corresponding next stage switch element (possibly responsive to flow control information received from a next stage switch element). Processing of the flow diagram of FIG. 4C is complete as indicated by process block 469.

Figure 5A:
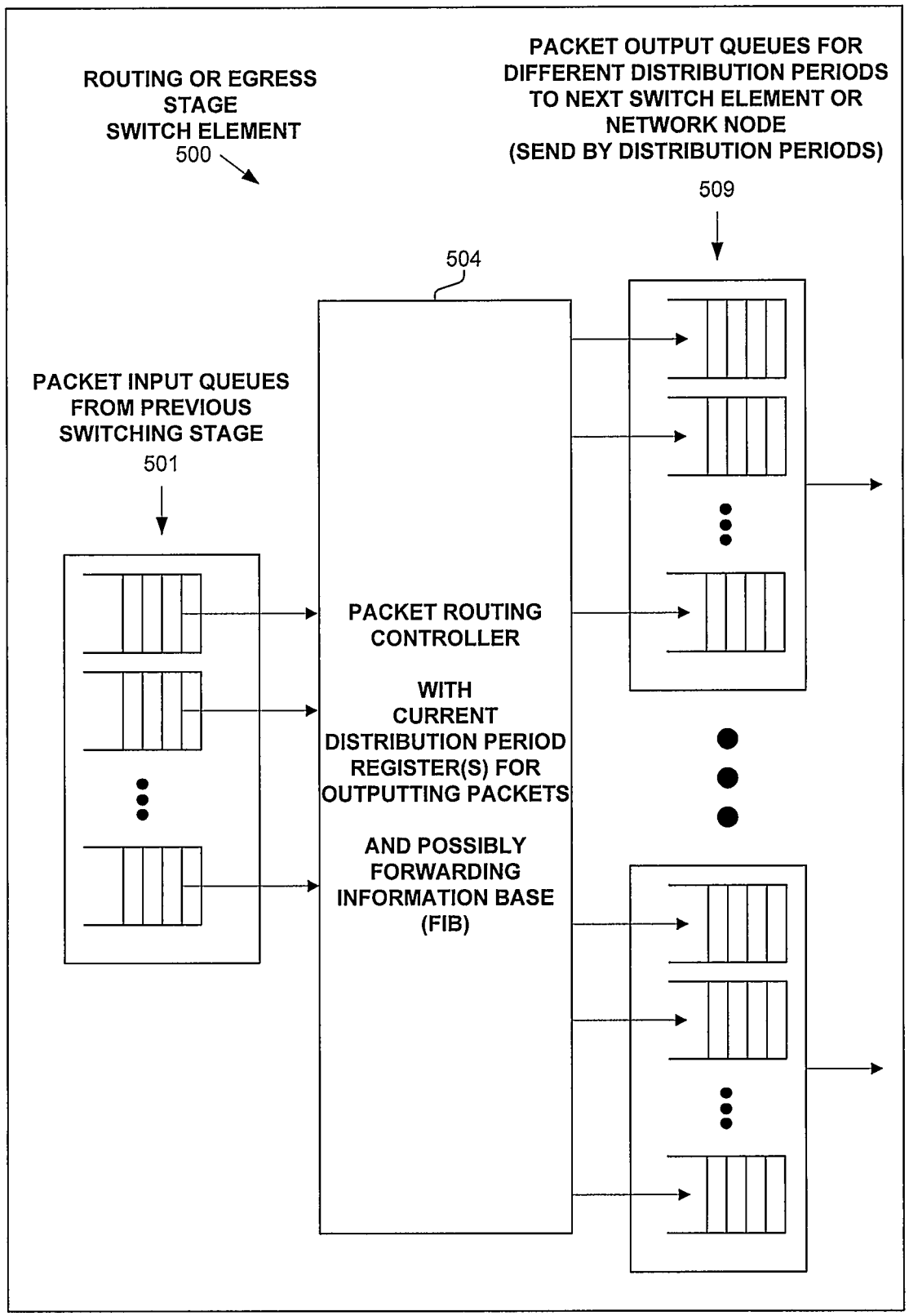
FIG. 5A illustrates a routing or egress stage switch element according to one embodiment.

FIG. 5A illustrates a routing stage or egress stage switch element 500 that performs packet reordering according to one embodiment (e.g., based on the current distribution period associated with each packet). As shown, routing stage or egress stage switch element 500 includes one or more input queues 501 for temporarily storing packets received from a previous stage switch element; a packet routing controller 504; and packet output queues 509 for sending packets to corresponding next stage switching elements or egress line cards/external network nodes each with individual queues for different distribution periods. The number of queues required for maintaining separate queues for sequential different distribution periods varies in one embodiment from two to the total number of different distribution periods (or any value in between). In one embodiment, the number of these queues is a function of the duration of distribution periods, latency over the different paths, congestion, and/or other factors.

In one embodiment, packet routing controller 504 includes one or more current distribution period registers for use in sending packets from queues 509 in order of distribution periods.

In one embodiment, packet routing controller 504 includes a forwarding information base for determining an output (509) for a packet. However, typically and in one embodiment, an ingress lookup operation (e.g., on a line card) already determined this information and is included in an internal header associated with the packet as it is forwarded through the packet switching device. The particular output queue 509 in which a packet is enqueued corresponds to the determined output interface and the packet's associated current distribution period indication (typically marked in an internal header of the packet).

Figure 5B:
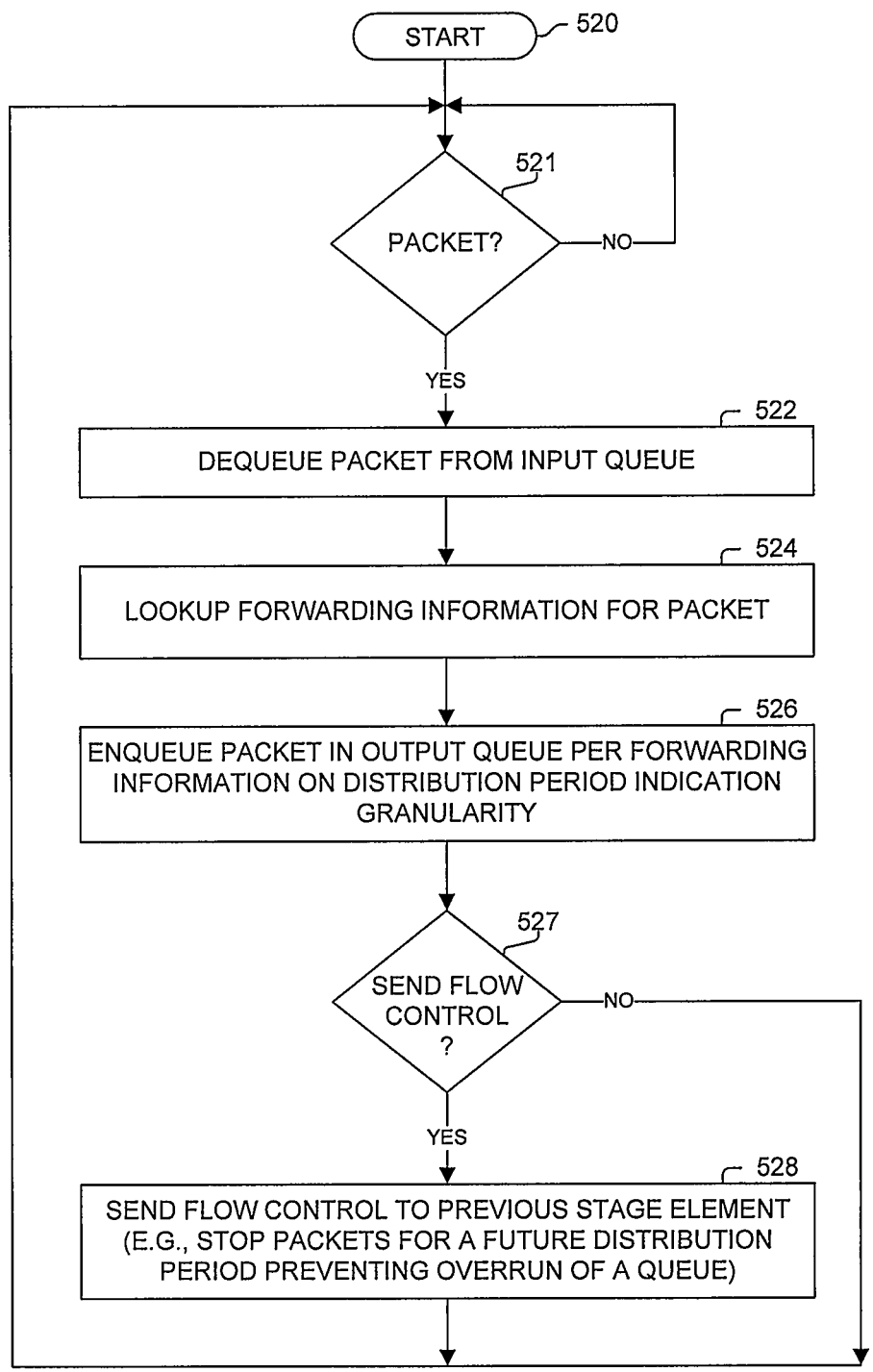
FIG. 5B illustrates a process according to one embodiment.

FIG. 5B illustrates a process performed by a routing stage or egress stage switch element that performs reordering of flows sent in different distribution periods. In one embodiment, multiple simultaneous processing of FIG. 5B are performed to simultaneously process multiple received packets (e.g., one process per input queue).

Processing of the flow diagram begins with process block 520, and proceeds to process block 521 where processing remains until there is a packet in an input queue to process in which case processing proceeds to process block 522. In process block 522, a packet is dequeued from an input queue. In process block 524, forwarding information is acquired (e.g., via a lookup operation or extracted from an internal header of the packet) to identify to which next switch stage switch element or line card/external network node to send the packet. In process block 526, the packet is enqueued in the output queue corresponding to this next switch stage switch element or line card/external network node and for the current distribution period associated with the packet (e.g., as marked in an internal header associated with the packet). If determined in process block 527 that no flow control information is needed, then processing returns to process block 521. Otherwise it was determined in process block 521 that this switch element has no free queue for storing packets associated with a new future distribution period, and therefore in process block 528, flow control information is provided to one or more previous stage switch elements to hold off sending packets associated with this new future distribution period (e.g., to avoid dropping of packets). Processing returned to process block 521.

Figure 5C:
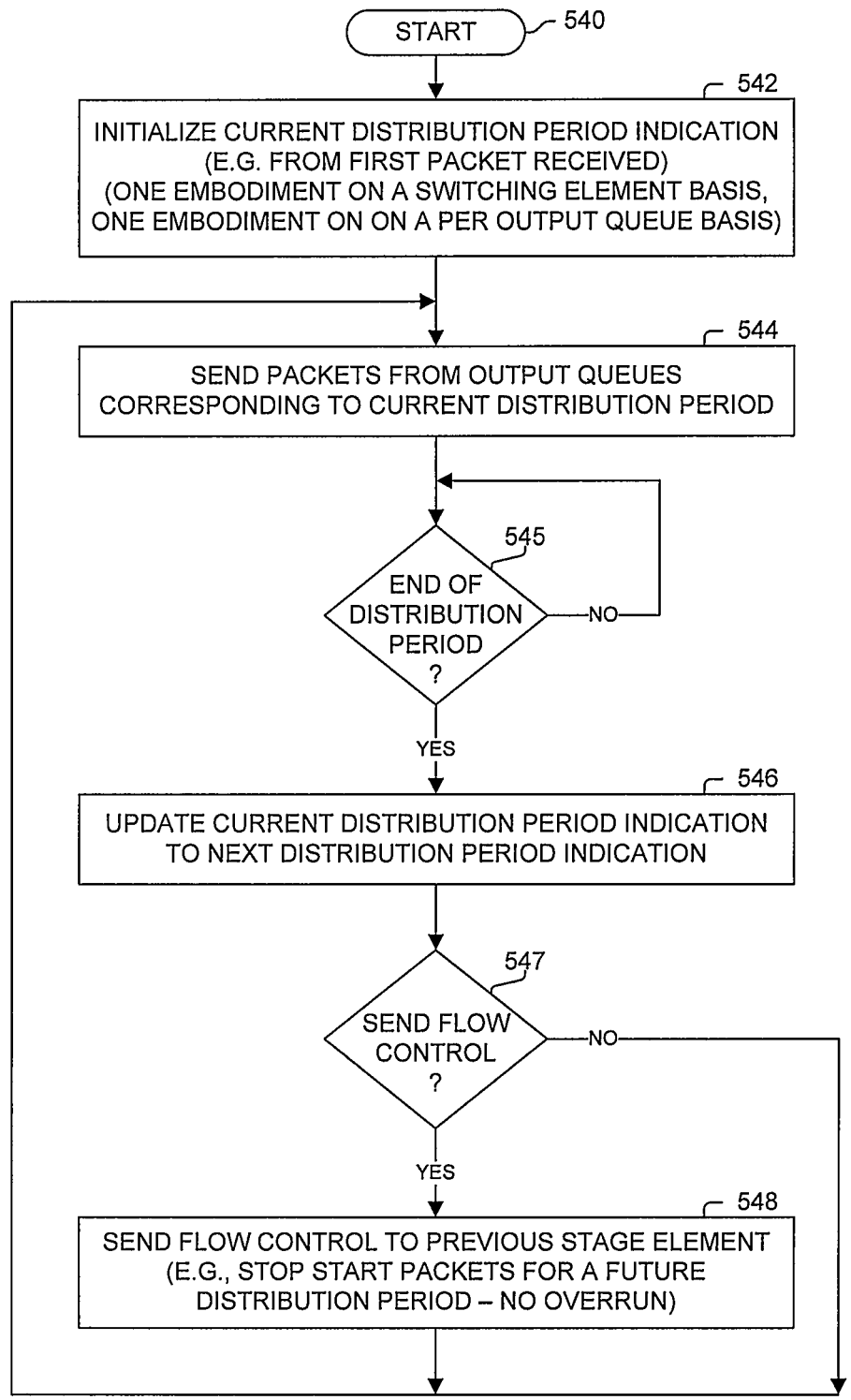
FIG. 5C illustrates a process according to one embodiment.

FIG. 5C illustrates a process performed by a routing stage or egress stage switch element that performs reordering of flows sent in different distribution periods. Processing begins with process block 540. In process block 542, one or more current distribution period indications is initialized (e.g., register(s) associated with sending packets from the output queues). In one embodiment, the same current distribution period is used for all output queues. In one embodiment, a current distribution period is maintained for each output.

In process block 544, packets are sent in order from the output queues corresponding to the current distribution period. As determined in process block 545, when all packets have been sent for the current distribution period (and no more are to be received such as, but not limited to, as determined by end of current distribution period indications received over all paths from all distributors, expiration of a timeframe for receiving packets of the current distribution period), processing proceeds to process block 546. In process block 546, the current distribution period indication is updated to the next in sequence distribution period indication.

If determined in process block 547 that no flow control information is needed, then processing returns to process block 544. Otherwise it was determined in process block 547 that this switch element has now a free queue for storing packets associated with a new future distribution period (and previously sent flow control information to stop sending of such related packet in one embodiment), and therefore in process block 548, flow control information is provided to one or more previous stage switch elements to allow sending packets associated with this new future distribution period (e.g., there is now space for queuing of these associated packets). Processing returned to process block 544.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. An apparatus, comprising:
a packet switching device including: a plurality of distribution switch elements, a plurality of routing stage switch elements, and a plurality of egress stage switch elements, with each of the plurality of routing stage switch elements providing a portion of a plurality of paths between each of the plurality of distribution switch elements and each of the plurality of egress stage switch elements; wherein the packet switching device continuously progresses, after a predetermined duration and in order of a plurality of ordered distribution periods, to a next current distribution period of the plurality of ordered distribution periods;
wherein for each current distribution period of the plurality of ordered distribution periods, each particular distribution switch element of the plurality of distribution switch elements sends distribution switch element received packets of a plurality of packet flows to a corresponding routing stage switch element of the plurality of routing stage switch elements, with packets of a same packet flow of the plurality of packet flows sent in received order, and with the corresponding routing stage switch element determined based on said current distribution period and the same packet flow such that the corresponding routing stage switch element varies for different distribution periods of the plurality of ordered distribution periods for the same packet flow;
wherein each of the plurality of egress stage switch elements stores outbound packets received from elements of the plurality of routing stage switch elements, in a plurality of packet output queues, with said outbound packets associated with consecutive distribution periods of the plurality of ordered distribution periods being said stored in different queues of the plurality of packet output queues; and
wherein for each current forwarding period of the plurality of ordered distribution periods: each particular egress element of the plurality of egress stage switch elements forwards packets for an output queue of the plurality of packet output queues associated with said current forwarding period, and progresses, in order of the plurality of ordered distribution periods, to a next current forwarding period of the plurality of ordered distribution periods, resulting in packets being sent from said particular egress element in the order of the plurality of ordered distribution periods and there within, in the order of receipt, without packet reordering by said particular egress element.

2. The apparatus of claim 1, wherein each said sent distribution switch element received packet is marked by a corresponding said distribution switch element with an indication of said current distribution period that is the same for all packet flows and all packets of said current distribution: and wherein said egress stage elements use the indication in determining said current distribution period associated with a packet.

3. The apparatus of claim 2, wherein said progressing to the next current forwarding period is performed by each particular egress stage switch element of the plurality of egress stage switch elements in response to said particular egress stage switch element having received a packet with the current distribution period indication from each of the plurality of routing stage switch elements.

4. The apparatus of claim 1, wherein at least one of the plurality of egress stage switch elements communicates flow control information to at least one of the plurality of distribution switch elements in response to not having an available one of the plurality of packet output queues for a subsequent distribution period of the plurality of ordered distribution periods after said current forwarding period.

5. The apparatus of claim 1, wherein the predetermined duration is a predetermined amount of time.

6. The apparatus of claim 1, wherein the predetermined duration corresponds to a predetermined number of packets transmitted.

7. The apparatus of claim 1, wherein the number of different distribution periods in the plurality of ordered distribution periods is equal to a number of paths between one of the plurality of distribution switch elements and one of the plurality of routing stage switch elements.

8. A method, comprising:
performing operations by a packet switching device, with the packet switching device including a plurality of distribution switch elements, a plurality of routing stage switch elements, and a plurality of egress stage switch elements, with each of the plurality of routing stage switch elements providing a portion of a plurality of paths between each of the plurality of distribution switch elements and each of the plurality of egress stage switch elements; wherein the packet switching device continuously progresses, after a predetermined duration and in order of a plurality of ordered distribution periods, to a next current distribution period of the plurality of ordered distribution periods;
wherein said operations include for each current distribution period of the plurality of ordered distribution periods, repeatedly and correspondingly sending a next plurality of packets in original order of a plurality of packet flows over a current path of a plurality of paths between distribution switch elements of the plurality of distribution switch elements and egress switch elements of the plurality of egress stage switch elements, with the current path for packets of the plurality of packet flows corresponding to said current distribution period and changing to a different path for a distribution period of the plurality of ordered distribution periods after said current distribution period, with the current path being different for at least two of the plurality of packet flows;
wherein said operations include each of the plurality of egress stage switch elements storing outbound packets, received from elements of the plurality of routing stage switch elements, in a plurality of packet output queues, with said outbound packets associated with consecutive distribution periods of the plurality of ordered distribution periods being said stored in different queues of the plurality of packet output queues; and
wherein said operations include for each current forwarding period of the plurality of ordered distribution periods: each particular egress element of the plurality of egress stage switch elements forwarding packets for an output queue of the plurality of packet output queues associated with said current forwarding period, and progressing, in order of the plurality of ordered distribution periods, to a next current forwarding period of the plurality of ordered distribution periods, resulting in packets being sent from said particular egress element in the order of the plurality of ordered distribution periods and there within, in the order of receipt, without packet reordering by said particular egress element.

9. The method of claim 8, wherein each of the packets of the plurality of flows of packets said sent by each of the plurality of distribution switch elements is marked with a current distribution period indication that identifies said current distribution period and is the same for all packet flows and all packets of said current distribution; and wherein said egress stage elements use the indication in determining said current distribution period associated with a packet.

10. The method of claim 9, wherein said progressing to the next current forwarding period is performed by each particular egress stage switch element of the plurality of egress stage switch elements in response to said particular egress stage switch element having received a packet with the current distribution period indication from each of the plurality of routing stage switch elements.

11. The method of claim 8, wherein the predetermined duration is a predetermined amount of time.

12. The method of claim 8, wherein the predetermined duration corresponds to a predetermined number of packets transmitted.

13. The method of claim 8, wherein the number of different distribution periods in the plurality of ordered distribution periods is equal to a number of paths between one of the plurality of distribution switch elements and one of the plurality of routing stage switch elements.

* * * * *